United States Patent
Bekelman et al.

(10) Patent No.: US 12,159,050 B1
(45) Date of Patent: Dec. 3, 2024

(54) DATA STORE CONVERSION FROM A SOURCE DATA STORE TO A VIRTUAL TARGET

(71) Applicant: Amazon Technologies, Inc., Seattle, WA (US)

(72) Inventors: Igor Bekelman, Redmond, WA (US); Mykyta Sokolov, Redmond, WA (US); Svitlana Malik, Gdańsk (PL); Mykhailo Silin, Gdańsk (PL); Irena Balin, Bellevue, WA (US); Yuriy Yaroshenko, Gdańsk (PL); Vladyslav Tkachuk, Gdańsk (PL)

(73) Assignee: Amazon Technologies, Inc., Seattle, WA (US)

( * ) Notice: Subject to any disclaimer, the term of this patent is extended or adjusted under 35 U.S.C. 154(b) by 425 days.

(21) Appl. No.: 17/710,498

(22) Filed: Mar. 31, 2022

(51) Int. Cl.
*G06F 3/06* (2006.01)
(52) U.S. Cl.
CPC .......... *G06F 3/0647* (2013.01); *G06F 3/0604* (2013.01); *G06F 3/0679* (2013.01)
(58) Field of Classification Search
CPC ..... G06F 3/0604; G06F 3/0647; G06F 3/0679
See application file for complete search history.

(56) References Cited

U.S. PATENT DOCUMENTS

| | | |
|---|---|---|
| 7,263,590 B1 | 8/2007 | Todd |
| 7,664,795 B2 | 2/2010 | Balin et al. |
| 9,430,505 B2 | 8/2016 | Padmanabhan |
| 9,922,108 B1 | 3/2018 | Meiklejohn |
| 9,996,562 B2 | 6/2018 | Higginson et al. |
| 10,430,433 B2 | 10/2019 | Stearn et al. |
| 11,119,865 B2 | 9/2021 | Vallabhaneni et al. |
| 2006/0010176 A1* | 1/2006 | Armington ........... G06F 9/4856 |
| 2006/0230319 A1* | 10/2006 | Ryali .................. G06F 11/3684 714/38.14 |
| 2012/0185427 A1* | 7/2012 | Fontignie .............. G06F 16/196 707/693 |
| 2017/0286412 A1 | 10/2017 | Mohanty |
| 2019/0130007 A1 | 5/2019 | Hao |
| 2019/0317944 A1 | 10/2019 | Deremigio et al. |
| 2021/0165759 A1 | 6/2021 | Bar-Nissan |
| 2021/0389976 A1* | 12/2021 | Haq ...................... G06F 16/214 |
| 2022/0035553 A1* | 2/2022 | Okoshi ................ G06F 3/0604 |
| 2023/0140109 A1 | 5/2023 | Dasi |
| 2023/0236816 A1 | 7/2023 | Bhutani |

OTHER PUBLICATIONS

U.S. Appl. No. 17/710,681, filed Mar. 31, 2022, Igor Bekelman, et al.

* cited by examiner

*Primary Examiner* — Larry T MacKall
(74) *Attorney, Agent, or Firm* — S. Scott Foster; Kowert, Hood, Munyon, Rankin & Goetzel, P.C.

(57) ABSTRACT

Conversion to a virtual target may be performed for a source of a data store migration. A request that selects one of multiple data store conversion targets as a virtual target of data store migration from a source of the data store migration may be received. One or more conversion scripts for the data store migration may be generated based on an analysis of a possible conversion between the source of the data store migration and the virtual target of the data store migration using metadata obtained from the source of the data store migration that describes the source of the data store migration and a model corresponding to the virtual target of the data store migration. The conversion scripts may be stored for later execution.

20 Claims, 9 Drawing Sheets

*conversion application user interface 610*

*conversion report 620*

Source: Instance A

| Target 621 | Complexity 623 | Schema count 625 | Auto or minimal changes 627 | Complex actions 629 |
|---|---|---|---|---|
| Same instance and new schema B | ... | ... | ... | ... |
| New instance and schema C (virtual) | ... | ... | ... | ... |
| New instance D (same schema) | ... | ... | ... | ... |

Source Data store: Instance X

Receive, via an interface of a data store conversion application, a request to analyze a possible conversion for a mapping of a data store migration, where the mapping includes:

multiple sources of the data store migration mapped to target(s) of the data store migration; or source(s) of the data store migration mapped to multiple targets of the data store migration
810

Obtain metadata from the selected source(s) and target(s) of the mapping
820

Generate conversions script(s) for the data store migration based on an analysis of the possible conversion of the mapping for the data store migration using the metadata
830

Store the schema conversion script(s) for execution
840

FIG. 8

DATA STORE CONVERSION FROM A SOURCE DATA STORE TO A VIRTUAL TARGET

BACKGROUND

As the technological capacity for organizations to create, track, and retain information continues to grow, a variety of different technologies for managing and storing the rising tide of information have been developed. Data store systems, for example, provide clients with many different specialized or customized configurations of hardware and software to manage stored information. The increasing amount of data that organizations must store and manage often correspondingly increases both the size and complexity of data storage and management technologies, like data store systems, which in turn escalate the cost of maintaining the information. New technologies seek to reduce both the complexity and storage requirements of maintaining data by introducing different data stores or data formats that offer different processing or maintenance capabilities. However, introducing multiple data formats is not without cost. Data is often processed by different systems which may not support the current data format of the data. Thus, the ability to perform techniques to move data between data stores that offer different capabilities, locations, or formats is desirable.

BRIEF DESCRIPTION OF THE DRAWINGS

FIG. 6 is an example of a schema conversion report that may be provided via an interface of a data store schema conversion application, according to some embodiments.

FIG. 8 is a high-level flowchart illustrating methods and techniques to implement multi-target and multi-source data store conversion, according to some embodiments.

Figure 1:
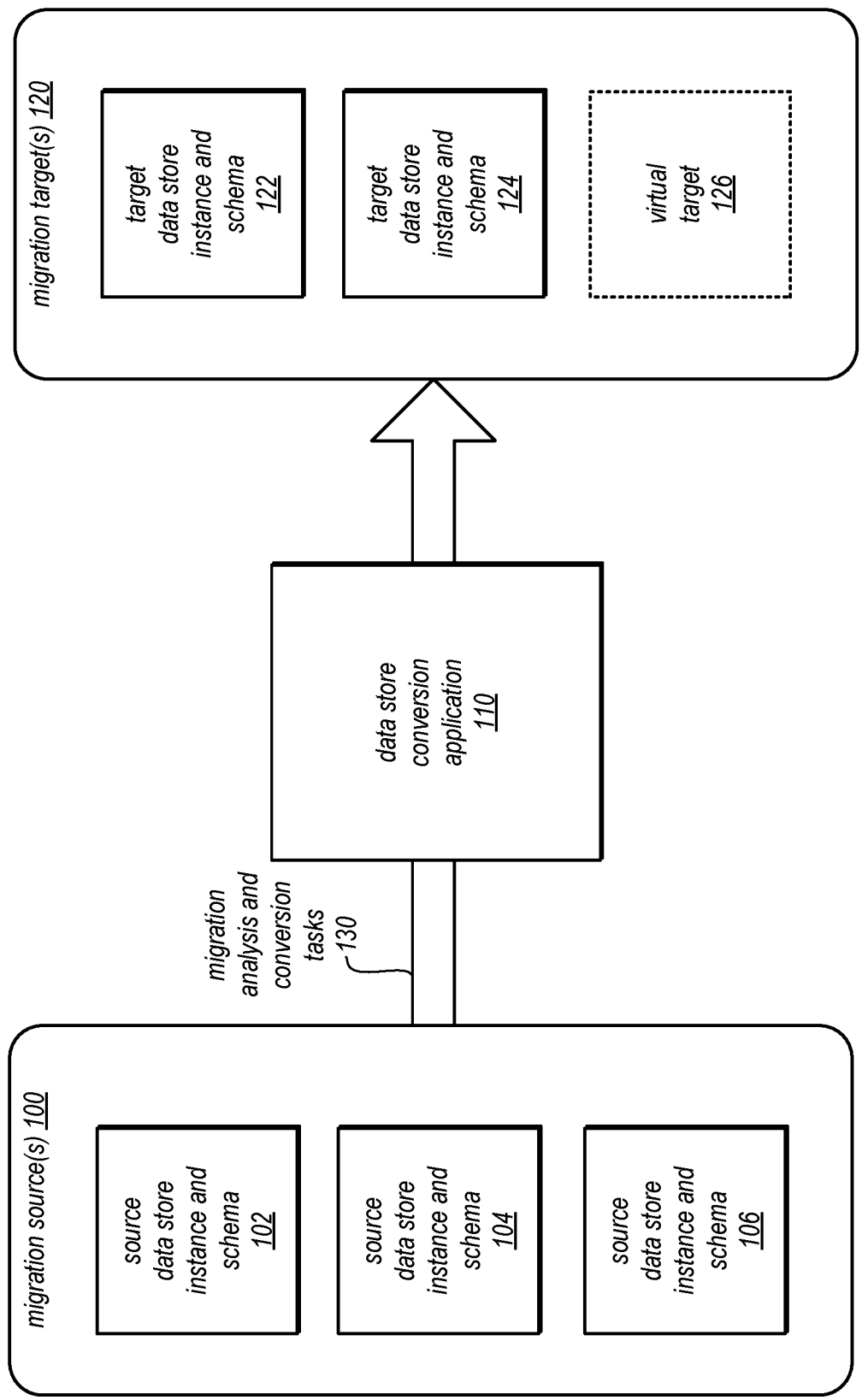
FIG. 1 is a logical block diagram illustrating data store conversion between multiple source data stores and target data stores, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of data store conversion from a source data store to a virtual target are described herein. Data store migration may be performed in various embodiments in order to move data from a current location to a desired new location. The new location may, for instance, utilize a different data store system or have different storage capacity (or other hardware capabilities) that make accessing the data more desirable, in some embodiments. In some embodiments, the new location may be a new data organization or schema, even if the same data storage management system (e.g., the same database management system) is used to access the data. Data store migration techniques may transform or otherwise modify the data as part of migration, in various embodiments. For example, data stored in a source data store may be stored in a schema (e.g., a file format, data format, etc.) that is different the schema used or supported by the target data store, in some embodiments.

Some data store migration techniques support only one conversion pair of data stores, which is firmly set when data store migration techniques are begun and cannot be overridden. In such techniques, a "conversion pair" may be a single source data store and a single target data store. For example, if a user wants to convert from one type of database system schema to another type of database system schema, that user can only connect to a single server of the first type of database system and a single server of a second type of database system. There is no possibility to add an additional type of database system schema (e.g., by adding another database server). In another example, if the user wants to add another type of data store system to the list of source data store systems (e.g., adding an additional server to existing source servers), there is no way to so.

Instead of limiting the number of data store migration techniques to a single conversion pair, in various embodiments, techniques for providing many-to-one, one-to-many, and many-to-many data store migration as part of a single data store migration project may be implement. In various embodiments, a data store conversion application or other system, service, or application that implements these techniques may support the ability to add multiple sources and targets (including, but not limited to database servers, Extract Transform Load (ETL) servers, Structured Query Language (SQL) scripts, various application using data stores among other examples of sources and targets for data store migration) and establish desired migration directions by mapping sources (or individual source objects) to desired targets.

The systems and techniques described in various embodiments below may provide many-to-one, one-to-many, and many-to-many data store migration may also support capabilities to handle the following scenarios:

- A stored procedure for execution at one data store has a link to an object in another data store (e.g., when using a "linked server" feature in a stored script to include an additional server that hosts another database).
- A query language script (e.g., such as SQL-based scripts for various database systems from different database providers) can access multiple data stores.
- Applications may include code or other operations that can access multiple data stores.
- ETL tools also often work with multiple sources and targets.
- Reports and Business Intelligence (BI) tools work with multiple sources and targets.

Additionally, instead of relying upon target data stores to be already created, in some embodiments, virtual targets may be used for data store schema conversions. Virtual targets will allow customers to perform most of the data store migration activity such as creating conversion tasks for data store objects, scripts or application data store calls, creating mapping and transformation rules for source/target objects and schemas pairs, resolving rules conflicts between source(s) and the virtual target, exploring conversion issues and saving the conversion results as scripts without the need to create real target data stores, which will save time and resources and which is especially significant for exploring the costs of data store migration without actually incurring costs. As discussed in detail below with regard to FIG. 4, virtual targets may be data store instances (e.g., database system instances).

FIG. 1 is a logical block diagram illustrating data store schema conversion between multiple source data stores and target data stores, including virtual target data stores, according to some embodiments. Migration source(s) 100 may be various kinds of data stores, such as various types of database systems (e.g., relational, non-relational, graph, time series, etc.), file systems, object store (e.g., a key-value object store, blob storage, data lakes, etc.), virtualized storage devices or systems (e.g., virtual block-based storage devices, such as virtual hard disk drives), or any other type of data store that may store data that is a source for migration to migration target(s) 120.

In at least some embodiments, some of these data stores may utilize various schemas for organizing and/or providing access to data. For example, database systems may utilize schemas, such as an arrangement of columns, data types, and or other information to describe the structure in which data is stored and accessed. Schemas may describe features such as the identifiers for data objects (e.g., key values that are used to perform an object lookup or retrieval in a key-value store, time values used to lookup log or other time series data, file paths, network addresses, names, or other identifiers used to obtain or access data in various data stores). Schemas may also, in some embodiments, indicate a physical arrangement of data (e.g., row-oriented, column-oriented, etc.).

Migration of data may include data movement, from one storage location to another, in various embodiments. These different locations may include changes in the hardware underlying the data store from location to another. For example, a migration of data from a source data store to a migration target may be migrating from database system on instance A to the same database system hosted on instance B. Instance A and instance B may be implemented on different computing resources (e.g., servers either physical or virtual hosted as part of a cloud computing service or other virtualized computing resources) with different hardware capacities and/or capabilities (e.g., in the amount of storage or speed of accessing the storage, the amount of processing capacity or speed of the processing capacity, amount of memory or speed of accessing the memory, the bandwidth or speed of network communication capacity, special processing features, such as various hardware optimized operation processing to decrease data processing times for various operations like regular expression searches, machine learning computations, etc.).

Migration of data may also include migration between schemas. For example, a migration could occur between the same type of storage system (e.g., the same type of database system and instance) but with different schemas (e.g., a different arrangement of or selection of data, such as dividing one database table into two tables, combining columns, removing columns, removing attributes, modifying data types of columns, etc.).

As noted above, migration may also impact various scripts, applications, code, or other features that utilize a data set either currently in a migration source 100 or would utilize data in a migration target 120.

Like migration source(s) 100, migration target(s) 120 may also be various kinds of data stores, such as various types of database systems (e.g., relational, non-relational, graph, time series, etc.), file systems, object store (e.g., a key-value object store, blob storage, data lakes, etc.), virtualized storage devices or systems (e.g., virtual block-based storage devices, such as virtual hard disk drives), or any other type of data store that may store data that is a target of data for migration to migration source(s) 100.

Data store conversion application 110 may be implemented as a standalone application, implemented as part of a service (e.g., offered by a cloud computing provider or other provider network), or implemented as part of a suite of tools for data store management. Data store conversion application 110 may receive selections of one or multiple source data stores, such as source data store instance and schemas 102, 104, and 106, and one or more target data stores, such as target data store instance and schemas 122, 124, and 126. Different combinations of one source to many targets, many sources to one target, and many sources to many targets may be selected via an interface for data store conversion application 110 (e.g., a command line interface, programmatic interface, and/or graphical interface, including but not limited to the example interfaces discussed below with regard to FIGS. 5 and 6). Such selected combinations may be considered as part of analysis and the generation of conversion tasks 130, as discussed in more detail below with regard to FIGS. 2-8.

As indicated at 126, a virtual target 126 may be considered as the one (or one of many) selected migration target 120 for migration analysis and conversion tasks 130 are generated. In some embodiments, analyzing a virtual target like virtual target 126 may utilize a model that represents the various features of the virtual target 126, as discussed below with regard to FIG. 4. In this way, analysis can be performed, as well as various conversion schema task scripts generated based on a data store that does not actually exist. The results of migration analysis and conversion tasks 130 may include various conversion reports and/or scripts, which may be stored for further access and/or execution (e.g., by data store conversion application 110) or a different system that performs migration), in some embodiments.

Please note that the previous description is a logical illustration and thus is not to be construed as limiting.

This specification continues with a general description of a data store conversion application that can be used to analyze and generate scripts for migrating data from multiple sources, to multiple targets, and/or both multiple sources and multiple targets. Then various examples of the data store conversion application including different components/modules, or arrangements of components/module that may be employed as part of implementing the data migration service are discussed. A number of different methods and techniques to implement data store conversion between multiple source data stores and target data stores are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
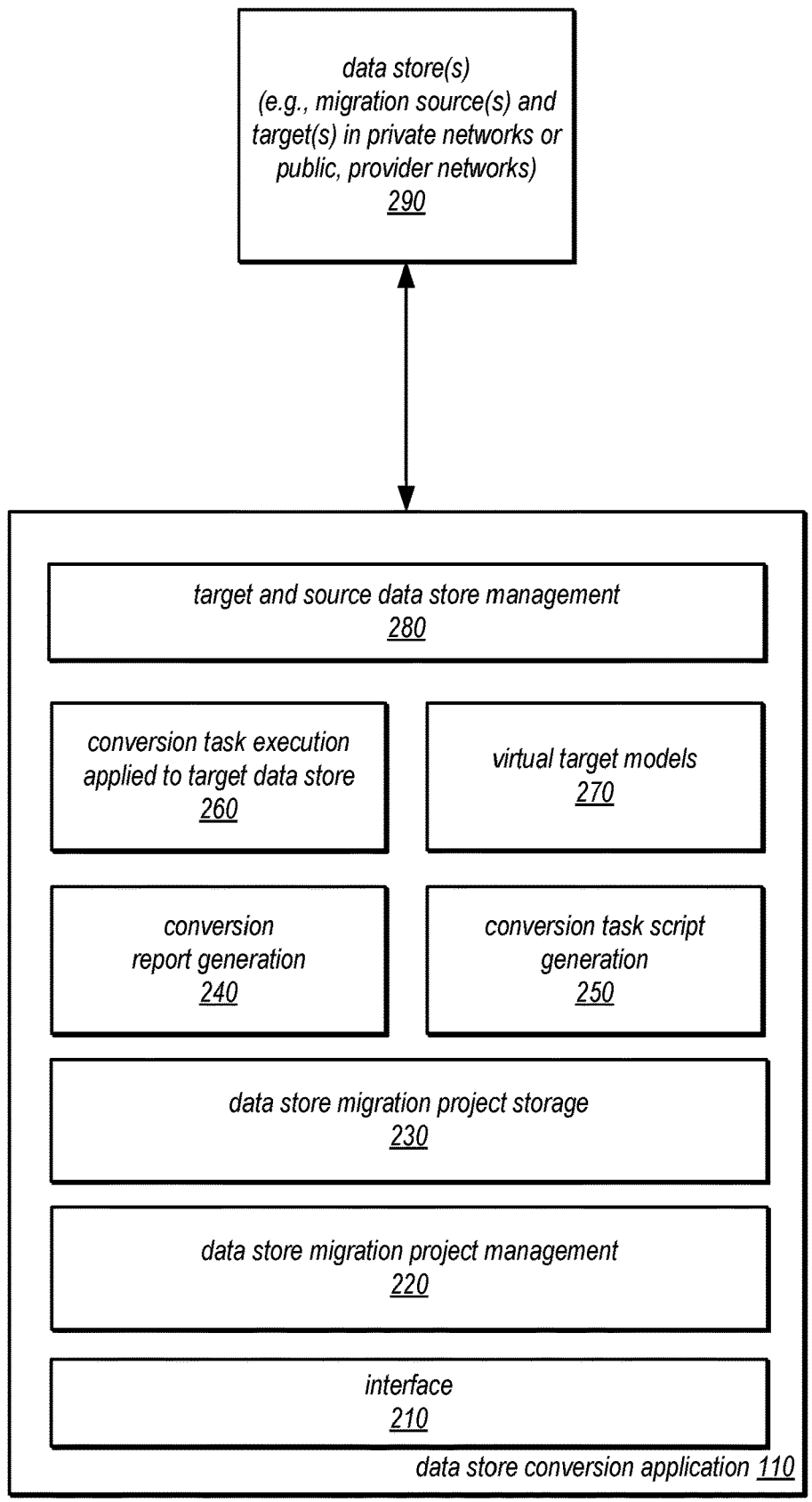
FIG. 2 is a logical block diagram illustrating a data store schema conversion application, according to some embodiments.

FIG. 2 is a logical block diagram illustrating a data store conversion application, according to some embodiments. Data store schema conversion application may implement interface 210. Interface 210 may be graphical, command line, and/or programmatic in order to support various interactions with users and/or client systems of data store schema conversion application 110. As discussed in detail below with regard to FIGS. 5 and 6, interface 210 may support various interactions to create migration projects for analysis, the generation of conversion scripts, the viewing of reports, the conversion of existing scripts, as well as various other features discussed below.

Figure 3:
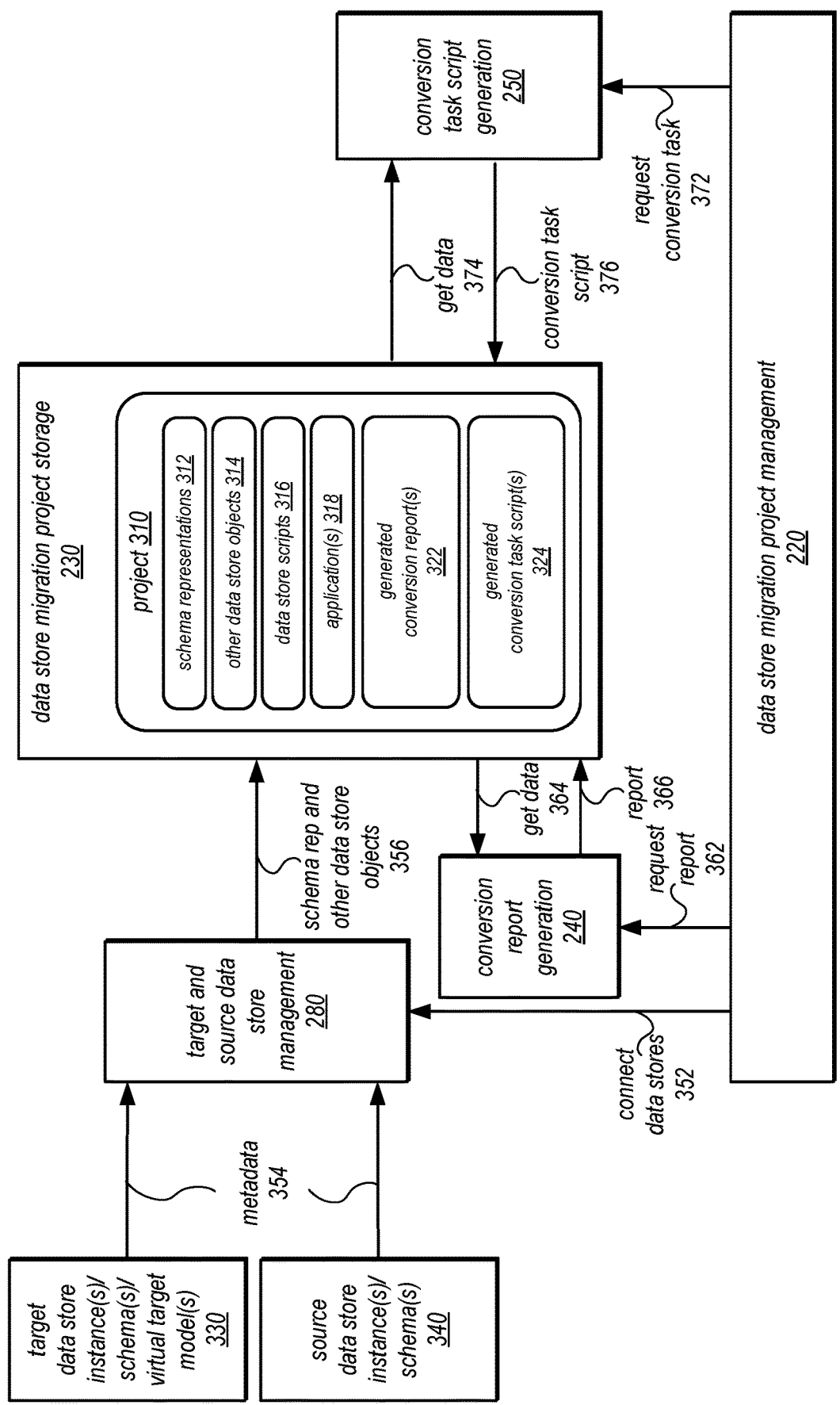
FIG. 3 is a logical block diagram illustrating interactions to generate conversion reports and conversion task scripts, according to some embodiments.

Data store schema conversion application 110 may implement data store migration project management 220, which, as discussed in detail below with regard to FIG. 3, may utilize data store migration project storage 230 to generate conversion reports using conversion report generation 240 and conversion task scripts using conversion task script generation 250. Virtual target models 270, as discussed below with regard to FIG. 4, may provide virtual targets that can be used to generate reports and task scripts without actually creating a target data store first.

Conversion task execution 260 may be implemented to apply generated task scripts to target data stores (e.g., in a provider network directly or via a service, such as a data store migration service). In some embodiments, conversion task execution 260 may create the target data stores if originally specified as virtual targets.

Target and source data store management 280 may be implemented to establish connections with data stores, obtain metadata, apply conversion task scripts, among other interactions with target and source data stores.

Data store schema conversion application 110 may integrate or interact with various types of data store systems or other services 290, such as those offered by a public provider network (e.g., a cloud provider) and/or in private networks (for which various access credentials or other communication information used to establish communication with data store conversion application may be obtained). Below is a description of an exemplary provider network which may implement both data storage services, data processing, services, and a data migration service. Provider network may be a private or closed system or may be set up by an entity such as a company or a public sector organization to provide one or more services (such as various types of cloud-based storage) accessible via the Internet and/or other networks to clients. Provider network may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network. In some embodiments, provider network may implement various computing resources or services, such as a data storage service(s) (e.g., data store services, object storage services, block-based storage services, or data warehouse storage services), data migration service, as well as other service(s) which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

In various embodiments, the components of a provider network may be implemented directly within computer hardware, as instructions directly or indirectly executable by computer hardware (e.g., a microprocessor or computer system), or using a combination of these techniques. For example, the components may be implemented by a system that includes a number of computing nodes (or simply, nodes), each of which may be similar to the computer system embodiment illustrated in FIG. 9 and described below. In various embodiments, the functionality of a given system or service component (e.g., a component of data storage service) may be implemented by a particular node or may be distributed across several nodes. In some embodiments, a given node may implement the functionality of more than one service system component (e.g., more than one data store component).

In some embodiments, one or more multiple data storage services may host migration sources and/or targets, which data store conversion application 110 may access as a client (as discussed below) to perform data migrations between data stores, which may be invoked by data store conversion application 110 (e.g., via an interface, such as one or more APIs). Data storage service(s) may implement different types of data stores for storing, accessing, and managing data on behalf of clients as a network-based service that enables clients to operate a data storage system in a cloud or network computing environment. For example, data storage service(s) may include various types of data store storage services (both relational and non-relational) or data warehouses for storing, querying, and updating data. Such services may be enterprise-class data store systems that are scalable and extensible. Queries may be directed to a data store or data warehouse in data storage service(s) that is distributed across multiple physical resources, and the data store system may be scaled up or down on an as needed basis. The data store system may work effectively with data store schemas of various types and/or organizations, in different embodiments. In some embodiments, clients/subscribers may submit queries in a number of ways, e.g., interactively via an SQL interface to the data store system. In other embodiments, external applications and programs may submit queries using Open Data store Connectivity (ODBC) and/or Java Data store Connectivity (JDBC) driver interfaces to the data store system.

Data storage service(s) may also include various kinds of object or file data stores for putting, updating, and getting data objects or files, which may include data files of unknown file type. Such data storage service(s) may be accessed via programmatic interfaces (e.g., APIs), command line interfaces, and/or graphical user interfaces. Data storage service(s) may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, a data migration service may perform data migrations between data stores, which may be invoked by data store conversion application 110 (e.g., via an interface, such as one or more APIs). For example, data migration service may perform homogenous migrations where the source and target data stores are the same or are compatible (e.g., the same or compatible storage engines, such as the same data store engines). In some embodiments, data migration service may perform heterogeneous migrations, where the source and target data stores are different or otherwise not compatible (e.g., different or incompatible storage engines, schemas, file or other data formats, such as different data store engines). One or both of source or target data stores may be external to provider network in some embodiments. Alternatively, one or both of source or target data stores may be hosted or implemented within provider network (e.g., on the same or different storage services). For heterogeneous migrations, a data migration service may automatically convert the data format (e.g., data store schema) to a format compatible with the target data store (e.g., a target data store schema), in some embodiments. Data migration service may consolidate or combine multiple data sets into a single data store (e.g., multiple data stores into one data store). Data migration service may perform a single copy of data from one data store to another or may provide continuous replication of changes at a source data store to a target data store, in some embodiments.

Other service(s) may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services. Various other distributed processing architectures and techniques may be implemented by data processing services (e.g., grid computing, sharding, distributed hashing, etc.). Note that in some embodiments, data processing operations may be implemented as part of data storage service(s) (e.g., query engines processing requests for specified data). Data processing service(s) may be clients of data migration in order to invoke the execution of a migration task to make data available for processing in a different location or data format for performing various processing operations with respect to data sets stored in data storage service(s).

Generally speaking, clients, such as data store conversion application 110, may encompass any type of client configurable to submit network-based requests to provider network via network, including requests for services (e.g., a request to create or execute data store migration, access data stores to perform conversion scripts or other data migration tasks, etc.). For example, a given client may include a suitable version of a web browser, or may include a plug-in module or other type of code module that may execute as an extension to or within an execution environment provided by a web browser. Alternatively, a client may encompass an application such as a data store conversion application 110. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client may be an application that interacts directly with provider network. In some embodiments, client may generate network-based services requests according to a Representational State Transfer (REST)-style network-based services architecture, a document- or message-based network-based services architecture, or another suitable network-based services architecture.

In some embodiments, a client may provide access to provider network to other applications in a manner that is transparent to those applications. For example, client may integrate with an operating system or file system to provide storage on one of data storage service(s) (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) may be coordinated by client and the operating system or file system on behalf of applications executing within the operating system environment.

Clients may convey network-based services requests (e.g., access requests directed to data in data storage service (s), operations, tasks, or jobs, being performed as part of other service(s), such as a data migration service) to and receive responses from provider network via a network. In various embodiments, the network may encompass any suitable combination of networking hardware and protocols necessary to establish network-based-based communications between clients and provider network. For example, network may generally encompass the various telecommunications networks and service providers that collectively implement the Internet. The network may also include private networks such as local area networks (LANs) or wide area networks (WANs) as well as public or private wireless networks. For example, both a given client and provider network may be respectively provisioned within enterprises having their own internal networks. In such an embodiment, the network may include the hardware (e.g., modems, routers, switches, load balancers, proxy servers, etc.) and software (e.g., protocol stacks, accounting software, firewall/security software, etc.) necessary to establish a networking link between given client and the Internet as well as between the Internet and provider network. It is noted that in some embodiments, clients may communicate with provider network using a private network rather than the public Internet.

As discussed above with regard to FIGS. 1 and 2, data store conversion application may support interactions to perform analysis for migration between one or more sources and one or more targets (e.g., including a virtual target in some embodiments). FIG. 3 is a logical block diagram illustrating interactions to generate conversion reports and conversion task scripts, according to some embodiments. Data store migration project management 220 may handle various requests submitted to data store conversion application 110, such as the various requests discussed below with regard to FIGS. 5 and 6. These requests may trigger various workflows or other sequences to direct the performance of various operations in order to provide requested conversions, analysis, or other features.

For example, data store migration project management may dispatch a request 352 to connect data stores to target and source data store management 280. Target and source data store management 280 may obtain metadata 354 from target data stores(s) or virtual target model(s) 330 as well as source data stores 340. Target source and data store management 280 may then evaluate, parse, extract and store information from the obtained metadata. For example, target source and data store management 280 may extract schema representations 312, such as applying various techniques to generate an abstract syntax tree as a schema representation, and store these schema representations 312 as part of project 310 in data store migration project storage 230. Metadata 354 may include other information used for migration analysis and conversion script generation, indicated as other data store objects 356 (e.g., instance configurations or other information about the capabilities of the hardware or instances for target or source data stores). For example, target source and data store management 280 may extract these other data objects 314, including information from a target model as discussed below with regard to FIG. 4, and store these other data objects 314 as part of project 310 in data store migration project storage 230.

Data store migration projection management 220 may request a report, as indicated at 362 be generated by conversion report generation feature 240. Conversion report generation 240 may get data, such as the schema representation and other data store objects from storage 230. Conversion report generation 240 may then run various analysis workflows to identify the various implications of data store migration between the source(s) and target(s), such as the complexity of conversion, including the number of automatically performed and manually performed conversion tasks. The report may be stored as indicated at 366 as part of generated schema conversion task report(s) 322.

As indicated at 372, data store migration project management 220 may dispatch a request to generate a script for a conversion task. Conversion task script generation 250 may obtain the appropriate data 374 from project 310 and apply various transformation rules to generate the appropriate scripts to convert schemas (from schema representations 312), scripts (from data store scripts 316), application interactions (from applications 318), or various other features for target data store(s), and store them, as indicated at 376 as generated schema conversion task script(s) 324 in storage 230. For example, schema representations 312 (e.g., stored as syntax trees) may be used as input to one or more transformation rule sets identified by conversion task script generation 250 that correspond to a selected target source. Instead of utilizing transformation rules sets that perform one-to-one transformation (e.g., from database system, instance, and/or schema A directly to database system, instance, and/or schema B), transformation rule sets may be from the generalized data stored as part of project 310, such as schema representations 312 and other data objects 314. In this way, data store conversion application can perform transformations into multiple targets from one or more sources without having to implement transformation rule sets for each possible combination of one-to-many, many-to-many, or many-to-one mappings that may be selected for data store conversion application to consider. Such techniques increase the capability of data store conversion application to provide various and fine-grained conversions between many different possible selected combinations that would otherwise not likely be supported.

Transformation rules in respective transformation rule sets may be applied for different conversion tasks, such as the conversion of schemas, the conversion of instance types, versions, and/or parameters, the conversion of various data store scripts 315, such as stored procedures executed by one type of database system that invoke or access another type of database system, or application(s) 318 (e.g., implemented as various scripts or other code which may utilize or access various data store features, such as different types of interface calls (e.g., APIs) or supported operations (e.g., various supported operations to perform various mathematical operations or other data operations).

Figure 4:
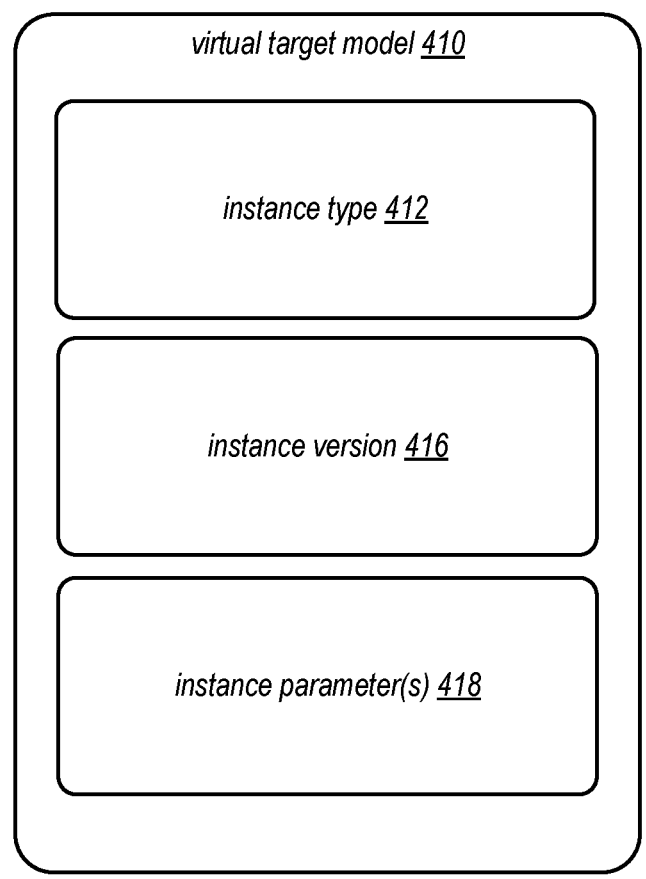
FIG. 4 is a data flow diagram illustrating the performance of error monitoring during migration tasks at a data migration service, according to some embodiments.

As noted above, there may be scenarios in which data store migration analysis and conversion may be desirable performed for prospective targets that do not yet exist. Instead of requiring a target to exist for migration, data store conversion application 110 may allow for virtual targets to be selectable. In this way, the same (or similar) analysis and conversion task script generation can be performed without having to access an existing data store, saving costs when developing or considering new data stores for data. Virtual target models, as discussed above with regard to FIGS. 2 and 3, may be maintained and utilized to make virtual targets selectable for analysis. FIG. 4 is a logical block diagram illustrating a virtual target model, according to some embodiments.

Instead of using an existing data store as a target, a virtual target may be selected for a data store migration project. Different virtual target models corresponding to different target data stores (e.g., of the various types of target data stores discussed above with regard to FIG. 1) may be maintained. Virtual target model 410 illustrates various features of a virtual target that may be maintained as part of a model, which may also allow for these features to then be utilized when performing various analysis, reporting, and conversion task generation techniques. For example, instance type 412 may be a type of data store management system or other data store system (e.g., various types of database system, such as Postgres®, MySQL®, SQL Server®, or other database system, various types of file systems, various types of object stores, various types of virtualized storage devices or systems, and so on). Virtual target model 410 may include, as part of instance type 412, the various supported features, schemas, operations, functions, interfaces, or other characteristics that are specific to that instance type 412.

Virtual target model 410 may also include an instance version 416. Instance version may include features such as the specific software version of the data store system corresponding to a respective version number of other version identifier. For example, virtual target model 410 may include, as part of instance version 416, the various supported features, schemas, operations, functions, interfaces, or other characteristics that are specific to that instance version 416.

Virtual target model 410 may also include an instance parameters 418. Instance parameters 418 may include hardware or other capabilities for the virtual target (e.g., memory size, storage size, processor speed/capacity, etc.) that may be specified for that instance. In this way, various conversion reports, analysis, and task script generation can account for the hardware configuration of an instance if it were to be created, acquired or provisioned (e.g., at a provider network service) with the respective instance parameters.

Figure 5:
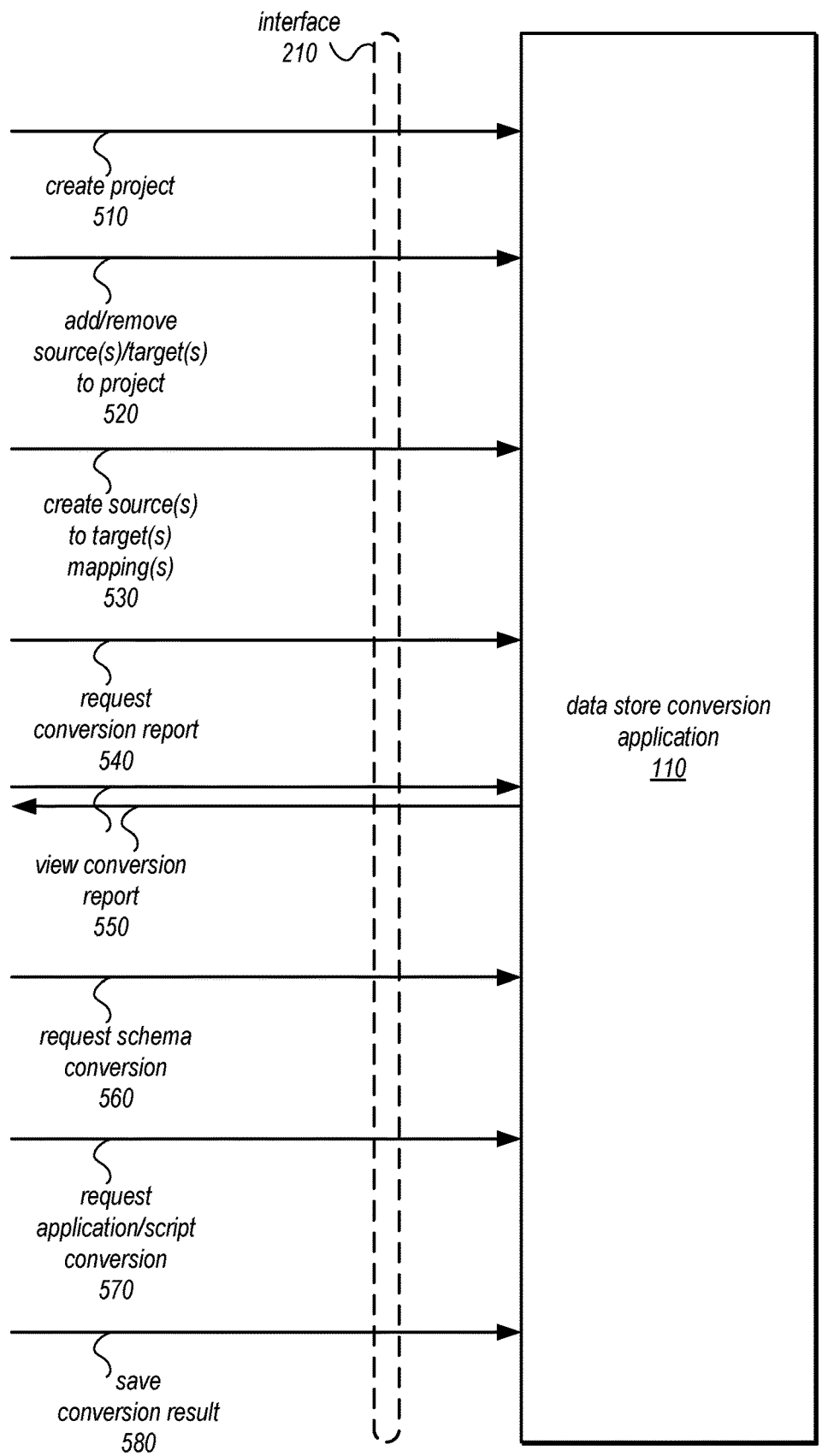
FIG. 5 is logical block diagram illustrating various interactions with a data store schema conversion application, according to some embodiments.

FIG. 5 is logical block diagram illustrating various interactions with a data store conversion application, according to some embodiments. As indicated at 510, a request to create a data store migration project may be received. The request may cause the creation of various data structures, files, tracking or other metadata, to facilitate the management and performance of various operations associated with a data store migration projection, such as the generation of conversion reports and data store conversion scripts for different tasks.

As indicated at 520, request(s) to add one or more source data stores and one or more target data stores may be received, in some embodiments. Multiple sources and/or multiple targets may be added to a project. As discussed above with regard to FIG. 4, various features of a virtual target may be specified so that the appropriate virtual target model may be used, in some embodiments. When selected or otherwise specified as part of requests 520, the corresponding data migration project may be updated to include the selected source(s) and target(s) in the project, making them selectable for mappings as discussed below. Similar techniques may be performed when the request 520 removes sources or targets, making them unavailable for mappings. In some embodiments, sources or targets may be selectable from a pre-populated list (e.g., for supported virtual targets). In some embodiments, the sources or targets may be populated from various interfaces that allow manual entry of source or target information (e.g., data base server network address, database system type, authorization information, etc.).

In some embodiments, various error handling messages may be provided as part of adding or removing source(s)/target(s). For example, authorization systems that are implemented as part of sources or targets may reject improper or unauthorized requests, which may prompt a response to provide appropriate authorization credentials (or to perform various actions to authorize the data store conversion application to access the sources or targets). Another type of error handling may involve As indicated at 530, requests to create source(s) to target(s) mappings may be received, in various embodiments. For example, as discussed above with regard to FIG. 1, a many sources to one target mapping may be created, or one source to many target mappings may be created, or many sources to many targets may be created. In some embodiments, virtual targets may be mapped as part of a one-to-many mapping, many-to-one mapping, many-to-many mapping, or a one-to-one mapping (where the virtual target is the only target for a single source). When selected or otherwise specified as part of requests 530, the corresponding data migration project may be updated to include the created mapping(s) in the project, making them included in the generation of various reports, scripts, or other analyses as discussed below.

As indicated at 540, a conversion report may be requested, as indicated at 540 for a mapping, in some embodiments. As discussed above with regard to FIG. 3 and below with regard to FIG. 5 may provide various information about the performance of a migrating to the target(s) according to the mapping in the migration project. The report may be viewed or otherwise accessed, as indicated at 550. An example of a conversion report is discussed below with regard to FIG. 6.

As indicated 560, a schema conversion may be requested, in some embodiments. For example, the mapping may be selected and used to create a script in a language or interface API that will cause a corresponding data model to be created in the target data store(s) according to respective transformation rule set(s) for the mapped targets, as discussed in detail above with regard to FIG. 3. For example, the conversion script may create a table according to the data model.

As indicated at 570, a request for application or script conversion may be performed, in various embodiments. The changes to match various source data store scripts or other actions taken by applications may be converted into a language, interface, format, and corresponding model of the target data store(s) according to respective transformation rule set(s) for the mapped targets, as discussed in detail above with regard to FIG. 3.

In some embodiments, the various conversions generated in response to requests 560 and 570 may be viewed and/or can be made editable. As indicated at 580, conversion results (either unedited or edited) can be saved, in some embodiments which may allow data store conversion application 110 to execute the saved conversion results, in some embodiments, or provide them to another system for execution.

FIG. 6 is an example of a schema conversion report that may be provided via an interface of a data store schema conversion application, according to some embodiments. Conversion application user interface 610 may, for example, be implemented as part of interface 210 of data store conversion application 110. Conversion application user interface 610 may be a graphical or command line presentation of a schema conversion report, such as conversion report 620 that is generated by data store conversion application 110.

Schema conversion report 620 may group the mappings between a source and multiple targets 621, in some embodiments. In the illustrated example, three different targets have been identified as being mapped from instance A, a target that is to the same instance with new schema B, a target that is a virtual target instance and new schema C, and a target that is a new instance D (with a same schema). Virtual targets may be identified or otherwise identified as virtual, in some embodiments. Various other features of the schema conversion report may be displayed. For example, the schema conversion report 620 may provide complexity 623 (e.g., providing a complexity score in terms of conversion efforts). In another example, the schema conversion report 620 may provide schema count 625. In another example, the schema conversion report 520 may provide automatic or minimal changes 627 that may be performed as part of conversion. In another example, the schema conversion report 620 may provide complex actions 629, which may include those actions that may have to be performed manually instead of through a generated script.

Similar information may be provided for another source, such as instance X, if one is included and mapped in the project. Note that other arrangements may be possible. Information specific to a pair within a multi-way mapping (e.g., between instance A and schema B) may be selectable and provided as a detailed review of a portion of the conversion report specific to that pair.

Figure 7:
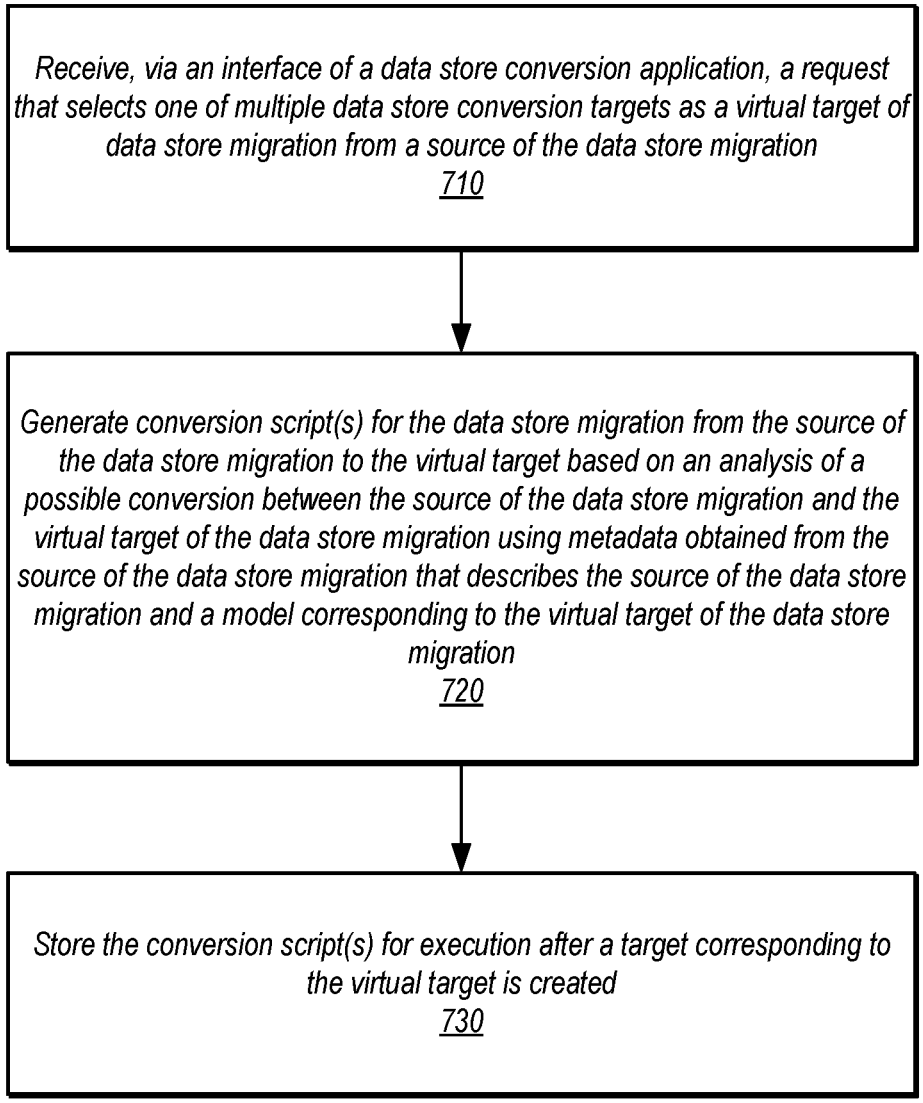
FIG. 7 is a high-level flowchart illustrating methods and techniques to implement data store conversion between a source of a data store migration and a virtual target, according to some embodiments.

Although FIGS. 2-6 have been described and illustrated in the context of an data store schema conversion application, the various techniques and components illustrated and described in FIGS. 2-6 may be easily applied to other data access or management systems in different embodiments that may facilitate data migration operations, such as data stores or other services that offer extract transform load (ETL) processing operations. As such, FIGS. 2-6 are not intended to be limiting as to other embodiments of a system that may implement migration analysis, conversion, and task script generation techniques migrations. FIG. 7 is a high-level flowchart illustrating methods and techniques to implement data store conversion between a source of a data store migration and a virtual target, according to some embodiments. Various different systems and devices may implement the various methods and techniques described below, either singly or working together. For example, a data store conversion application such as described above with regard to FIGS. 1-6 may implement the various methods. Alternatively, a combination of different systems and devices may use the below techniques. Therefore, the above examples and or any other systems or devices referenced as performing the illustrated method, are not intended to be limiting as to other different components, modules, systems, or configurations of systems and devices.

As indicated at 710, a request may be received via an interface of a data store conversion application that selects one of multiple data store conversion targets as a virtual target of data store migration from a source of the data store migration, in some embodiments. As discussed above with regard to FIG. 1 and FIG. 6, various different sources may be selected for migration. A source may be an instance of a data store for example, and may have various features specific to that source, including the instance type, instance version, and instance parameters (e.g., similar to the information maintained as part of a target model in FIG. 4). These sources may have been previous specified in requests to add them to a migration project, in some embodiments.

In some embodiments, different virtual targets may be supported by the data store conversion application that include various different features, as discussed above with regard to FIG. 4. For example, the virtual target may have a respective instance type, instance version, and instance parameters. In various embodiments, the virtual target may be searched for or otherwise specified by the request including instance type, instance version, and instance parameters request, which may specify one or more of the virtual target. In some embodiments, a virtual target may be created in response to the request selecting the virtual target according to information specified in the request.

As indicated at 720, conversion script(s) may be generated for the data store migration from the source of the data store migration to the virtual target, according to some embodiments. The conversion script(s) may be generated based on an analysis of a possible conversion between the source of the data store migration and the virtual target of the data store migration using metadata obtained from the source of the data store migration that describes the source of the data store migration and a model corresponding to the virtual target of the data store migration, according to some embodiments. For example, as discussed above, the metadata may include various information such as schema information, information descriptive of the instance or other host for the source, and other information that may be used to describe the arrangement of the data. The model may be the virtual target model that corresponds to the virtual target, including information like instance type, instance version, and instance parameters in the model.

The generation of the conversion scripts may be performed using an analysis directed according to various transformation rule sets that can be used to find and transform schemas, scripts, or applications. For example, transformation rule sets may be categorized according to the described conversion script type (e.g., schema conversion, application conversions, or data store script conversions). Within each of the categories of transformation rule sets, rule sets for respective targets, including virtual targets, may be maintained. Thus to generate the conversion script(s), the appropriate rule set may be identified (e.g., according to a specific request to generate a particular kind of conversion script or according to a default that performs schema conversion script generation automatically and other script conversion upon further request).

As indicated at 730, the conversion script(s) may be stored for execution after a target corresponding to the virtual target is created, in some embodiments. For example, the conversion script(s) may be provided via an interface and saved, as discussed above with regard to FIG. 5. In some embodiments, the target may be created (e.g., provisioned, configured, started, or otherwise enabled) by the data store conversion application or another system implementing the data store conversion application. For example, one or more requests may be submitted to a provider network to provision an instance that matches or corresponds to the instance modeled for the virtual target. Then, the conversion script(s) may be executed with respect to the created target (e.g., via interfaces to the source and target and/or by providing the script to a migration tool or service for execution).

As discussed above, one-to-many, many-to-one, and many-to-many data store conversions may enhance the conversion capabilities when planning for and executing a migration that converts between various sources and targets. FIG. 8 is a high-level flowchart illustrating methods and techniques to implement multi-target and multi-source data store conversions, according to some embodiments. As indicated at 810, a request to analyze a possible schema conversion for a mapping of a data store migration may be received via an interface of a data store conversion application. The request to analyze may be a request to generate a report or a request to generate various conversions, such as schema conversions, application conversions, or data store script conversions. The mapping may include multiple sources of the data store migration mapped to one or more targets of the data migration, or the mapping may include one or more sources of the data migration mapped to multiple targets of the data migration. As noted above in FIG. 6, the difference between source and target may be differences in arrangement of data (e.g., a source may be an instance with one schema and a target may be the same instance (or at least an instance configured the same as the source instance) with a different schema (e.g., splitting, combining, or altering table data). As discussed above with regard to FIG. 7, one or more of the targets may be a virtual target.

As indicated at 820, metadata from the selected source(s) and target(s) may be obtained, in some embodiments. For example, metadata may be requested, accessed, or determined from schema and other information maintained by sources or targets (e.g., table schema information, describe instance requests which may describe the instance information such as type, version, and parameters, etc.). The metadata for a target that is a virtual target may be obtained from the corresponding virtual target model. In some embodiments, the metadata may have been previously obtained (e.g., prior to the request to analyze). As noted earlier, the metadata may include various information such as schema information, information descriptive of the instance or other host for the source, and other information that may be used to describe the arrangement of the data.

As indicated at 830, conversion script(s) may be generated for the data tore migration based on an analysis of the possible conversion of the mapping for the data store using the metadata, in some embodiments. Similar to the discussion above with regard to FIG. 7, the generation of the conversion scripts may be performed using an analysis directed according to various transformation rule sets that can be used to find and transform schemas, scripts, or applications. For example, transformation rule sets may be categorized according to the described conversion script type (e.g., schema conversion, application conversions, or data store script conversions). Within each of the categories of transformation rule sets, rule sets for respective targets, including virtual targets, may be maintained. Thus to generate the conversion script(s), the appropriate rule set may be identified (e.g., according to a specific request to generate a particular kind of conversion script or according to a default that performs schema conversion script generation automatically and other script conversion upon further request).

As indicated at 840, the schema conversion script(s) may be stored for execution, in some embodiments. For example, the conversion script(s) may be provided via an interface and saved, as discussed above with regard to FIG. 5. The conversion script(s) may be executed with respect to the source(s) and target(s) (e.g., via interfaces to the source(s) and target(s) and/or by providing the script to a migration tool or service for execution).

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
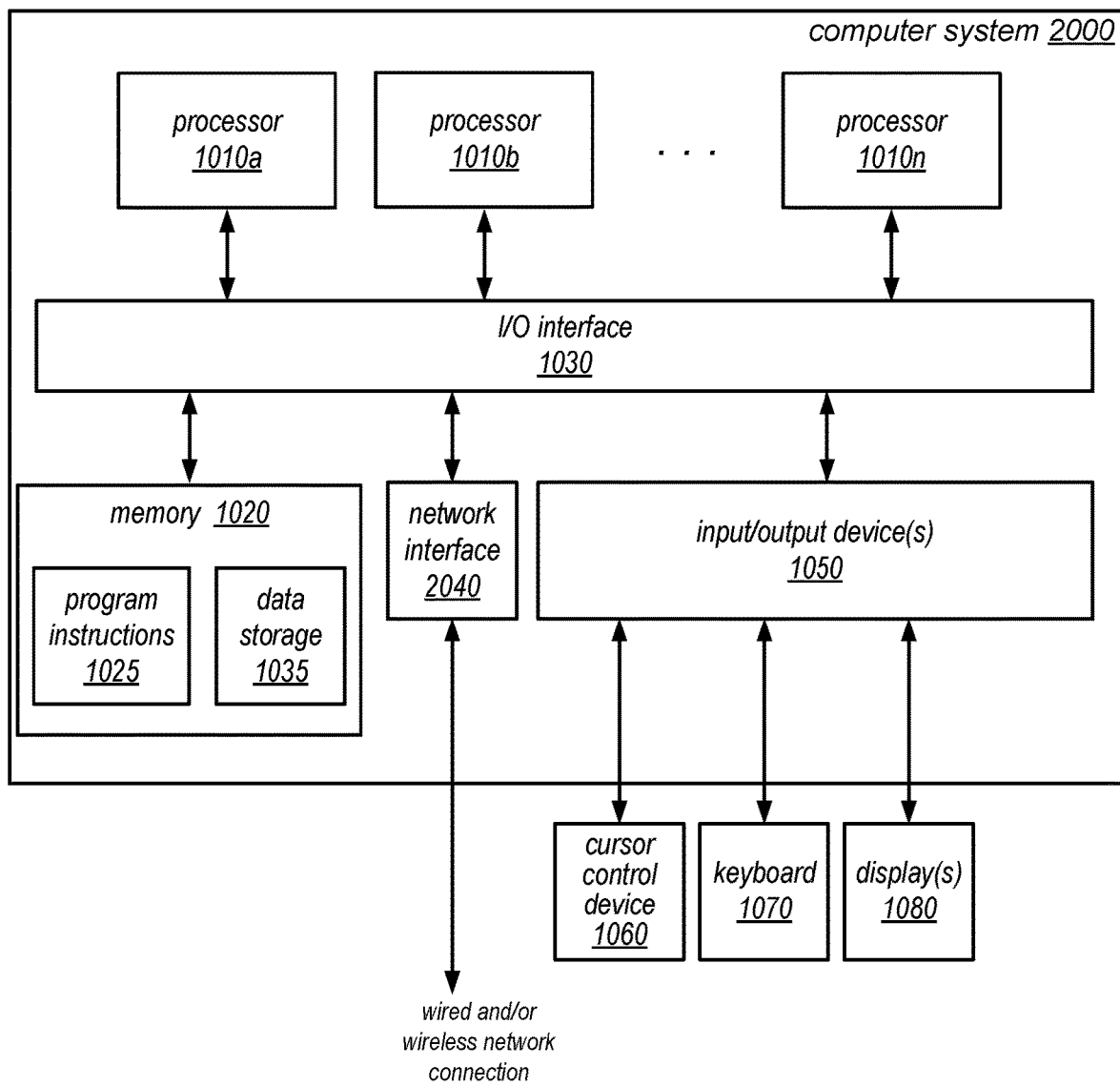
FIG. 9 illustrates an example system that may implement the various methods, techniques, and systems described herein, according to some embodiments.

Embodiments of multi-target and multi-source data store conversion and embodiments of data store conversion between a source of a data store migration and a virtual target as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system, compute system, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for multi-target and multi-source data store conversion and data store conversion between a source of a data store migration and a virtual target may be stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or data store services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a data store conversion application, configured to:
      responsive to a request to map a source of a data store migration to a virtual target of the data store migration, create a mapping between the source of the data store migration and the virtual target data store migration as part of a data store migration project, wherein the virtual target is a selected one of a plurality of data store conversion targets modeled by the data store conversion application;
      responsive to a request received via the interface for one or more conversion scripts, generate the one or more conversion scripts for the data store migration based on an analysis of the mapping using metadata obtained from the source of the data store migration that describes the source of the data store migration and a model corresponding to the virtual target of data store migration; and
      store the one or more conversion scripts as part of the data store migration project for execution by the data store conversion application after a target corresponding to the virtual target is created.

2. The system of claim 1, wherein the data store conversion application is further configured to:
   generate a conversion report for the mapping created via the interface of the data store conversion application between the source of the data store migration and the virtual target; and
   provide access to the conversion report via the interface of the data store conversion application, wherein the conversion report indicates the virtual target.

3. The system of claim 1, wherein the mapping further includes a second one of the plurality data store conversion targets that is not virtual.

4. The system of claim 1, wherein the data store conversion application is further configured to:
   create the target that corresponds to the virtual target; and
   execute the one or more stored conversion scripts.

5. A method, comprising:
   receiving, via an interface of a data store conversion application, a request that selects one of a plurality of data store conversion targets as a virtual target of data store migration from a source of the data store migration;
   generating, by the data store conversion application, one or more conversion scripts for the data store migration based on an analysis, by the data store conversion application, of a possible conversion between the source of the data store migration and the virtual target of the data store migration using metadata obtained from the source of the data store migration that describes the source of the data store migration and a model corresponding to the virtual target of data store migration; and
   storing, by the data store schema conversion application, the one or more schema conversion scripts for execution after a target corresponding to the virtual target is created.

6. The method of claim 5, further comprising:
   generating, by the data store conversion application, a conversion report for a mapping created via the interface of the data store conversion application between the source of the data store migration and the virtual target;
   providing access to the conversion report via the interface of the data store conversion application.

7. The method of claim 5, wherein the request includes a second virtual target for the data store migration to include as part of the generating the one or more conversion scripts for the data store migration.

8. The method of claim 5, wherein source of the data store migration and the virtual target are added to a data store migration project via the interface of the data store conversion application.

9. The method of claim 8, further comprising adding a second virtual target to the data store migration project responsive to a different request received via the interface of the data store conversion application, wherein the second virtual target is selectable to add to a mapping between the source data store and the virtual target or to a different mapping.

10. The method of claim 5, wherein the request that selects the selects one of a plurality of data store conversion targets as the virtual target specifies at least one of an instance type, an instance version, or an instance parameter.

11. The method of claim 5, wherein the one or more conversion scripts include a conversion of a data store script to execute with respect to the virtual target.

12. The method of claim 5, wherein the one or more conversion scripts include a script to create a table in the target corresponding to the virtual target.

13. The method of claim 5, further comprising executing, by the data store conversion application, the stored one or more conversion scripts.

14. One or more non-transitory, computer-readable storage media, storing program instructions that when executed on or across one or more computing devices cause the one or more computing devices to implement a schema conversion application, that implements:
   receiving, via an interface of the data store conversion application, a request that selects one of a plurality of data store conversion targets as a virtual target of data store migration from a source of the data store migration;
   generating one or more conversion scripts for the data store migration based on an analysis by the data store conversion application, of a possible conversion between the source of the data store migration and the virtual target of the data store migration using metadata obtained from the source of the data store migration that describes the source of the data store migration and a model corresponding to the virtual target of data store migration; and storing the one or more schema conversion scripts for execution after a target corresponding to the virtual target is created.

15. The one or more non-transitory, computer-readable storage media of claim 14, storing further instructions that when executed by the one or more computing devices cause the data store conversion application to further implement:
    generating a conversion report for a mapping between the source data store and the virtual target; and
    providing access to the conversion report via the interface of the data store conversion application.

16. The one or more non-transitory, computer-readable storage media of claim 14, wherein the request selects a second target for the data migration that is not virtual.

17. The one or more non-transitory, computer-readable storage media of claim 14, wherein the source of the data store migration and the virtual target are added to a data store migration project via the interface of the data store conversion application.

18. The one or more non-transitory, computer-readable storage media of claim 14, wherein the request that selects the one of a plurality of data store conversion targets as the virtual target, specifies at least one of an instance type, an instance version, or an instance parameter.

19. The one or more non-transitory, computer-readable storage media of claim 14, wherein the one or more conversion scripts include a conversion of an existing data store script to execute with respect to the virtual target.

20. The one or more non-transitory, computer-readable storage media of claim 14, storing further instructions that when executed by the one or more computing devices cause the data store conversion application to further implement executing, by the data store conversion application, the stored one or more conversion scripts.

* * * * *